Oct. 30, 1934. C. F. M. VAN BERKEL Re. 19,358

METHOD OF AND APPARATUS FOR WRAPPING FOODSTUFFS

Original Filed Jan. 18, 1928 2 Sheets-Sheet 1

Inventor:
Cornelis F. M. van Berkel

By Cheever, Cox & Moore
Att'ys.

Oct. 30, 1934. C. F. M. VAN BERKEL Re. 19,358

METHOD OF AND APPARATUS FOR WRAPPING FOODSTUFFS

Original Filed Jan. 18, 1928 2 Sheets-Sheet 2

Inventor:
Cornelis F. M. van Berkel

By Cheever, Cox & Moore
Attys.

Reissued Oct. 30, 1934

Re. 19,358

UNITED STATES PATENT OFFICE 19,358

METHOD OF AND APPARATUS FOR WRAPPING FOODSTUFFS

Cornelis F. M. van Berkel, Wassenaar, Netherlands, assignor to U. S. Slicing Machine Company, La Porte, Ind., a corporation of Indiana Original No. 1,801,650, dated April 21, 1931, Serial No. 247,511, January 18, 1928. Application for reissue April 14, 1933, Serial No. 666,123. In Great Britain February 25, 1927

15 Claims. (Cl. 93—2)

This invention relates to a method of and apparatus for wrapping foodstuffs, particularly slices of meat, in a hygienic manner, the method and apparatus being for employment in connection with weighing scales or slicing machines.

At present, the method usually adopted has consisted in placing a flat sheet of wrapping material (e. g. paper) upon the receiving platform of the weighing scale or slicing machine and depositing the food on the sheet. It has been found that it is rather difficult to remove this sheet with the food thereon from the platform, without handling the food, owing to the suction and friction between the sheet and the platform.

The object of this invention is to obviate the above disadvantage, and to this end the invention consists in inserting a supporting member between upper and lower portions of a folded wrapping sheet and positioning said member, with the sheet, upon the slice-receiving platform and, when the food to be wrapped is deposited upon the upper portion of the sheet, moving the member clear of the platform and simply turning the lower portion of the sheet over the top of the food, whereafter the latter can be wrapped in the sheet in usual manner.

The folded sheet may be placed initially on the platform and the supporting member thereafter positioned between the upper and lower portions of the sheet prior to the slicing of the food.

The wrapping sheet may be folded in such a manner that the lower portion thereof extends beyond the upper portion. The positioning of the wrapping sheet with the lower portion extending beyond the upper portion is for a purpose which will appear hereinafter in connection with the use of this invention with the so-called "meat stackers".

The supporting member comprises a flat plate, or the like, fitted with a handle and co-acting means may be provided on the member and on the platform for insuring that the member will be positioned correctly for receiving the food to be wrapped. The co-acting means preferably comprises a separable connection which insures that the plate will occupy a predetermined position on the supporting member and will be prevented from moving relatively to the supporting member by said co-acting means during the use of the machine.

Another object of this invention resides in the use of a member to be located on the slice receiving plate or extending over the slice receiving plate in a predetermined relation thereto for the purpose of stacking slices. This is accomplished by having the wrapping material extending above and below said member with the upper surface thereof in a position to receive the slices as they are severed by the knife.

One embodiment of the apparatus for carrying out the invention is illustrated by way of example in the accompanying drawings in which—

Figure 1:
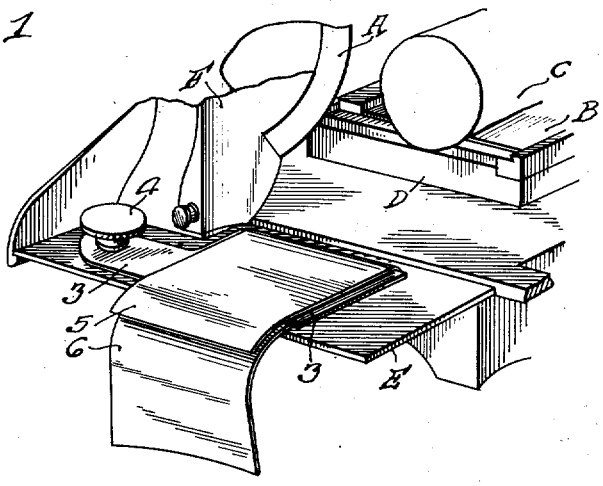
Fig. 1 is a fragmentary perspective view of a slicing machine showing a wrapping sheet positioned for reception of the food to be sliced by the slicing knife, only so much of the machine as is necessary for fully understanding the invention being shown.

Referring to the drawings, the slicing machine therein shown is of well-known construction and comprises a rotary slicing knife A, a feed plate B on which the food C to be sliced is clamped, a reciprocatory carriage D adapted to carry the feed plate with the food thereon to and fro past the knife, and a platform E toward which the slices cut by the knife are directed by a slice deflector F.

Figure 2:
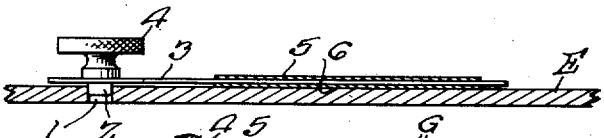
Fig. 2 is a section of the slice-receiving platform with a wrapping sheet and supporting member positioned thereon.
Figure 3:
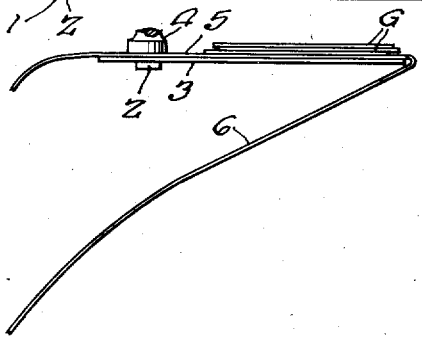
Fig. 3 is a view of the supporting member removed from the machine and with the wrapping sheet and slices thereon, the view being taken in the direction of the arrow III of Fig. 1.

The platform E has formed in it (Fig. 2) an aperture 1 into which can be inserted, as shown, a projection 2 on a flat plate 3 constituting a supporting member for the slices and provided with a handle 4. This plate 3 is shown interposed between upper and lower portions 5 and 6 of a folded wrapping sheet, the lower portion 6 being greater than the upper portion 5.

As will be seen in the drawings and in particular in Figure 1 thereof, the end of the portion 5 of the wrapping sheet may extend beyond the plate 3 to directly overlie the lower portion 6 of the sheet. The two portions are thus arranged so that they may directly contact beyond the edge of the plate. Further, it will be seen that the upper portion 5 of the wrapping sheet is directly above the lower portion 6 so that the weight of foodstuff received on the upper portion is directed toward the lower portion, which weight tends to compress the lower portion between the plate and the platform E.

When the food is about to be sliced, the plate 3 is interposed between the portions 5 and 6 of a folded wrapping sheet and placed in position on the platform E, as shown in Fig. 1. When the requisite amount of food has been deposited in slices G near the fold upon the portion 5, the plate 3 is removed from the platform. The portion 6 is then turned, in a counterclockwise direction over the top of the food which can thereafter be wrapped in usual manner in the sheet.

This method of wrapping is particularly adaptable for use in connection with such meat slicing machines as are provided with so-called "meat stackers", such for example as make a partial revolution, the slices in such machines being spread automatically upon the wrapping sheet without handling. Further, it will be apparent that the slice-receiving platform E could be the platform of a weighing scale. It is obvious, however, that slices may be spread on the sheet in shingle fashion by pulling the free edge of the portion 5 of the sheet a predetermined distance as a slice is cut.

Figure 4:
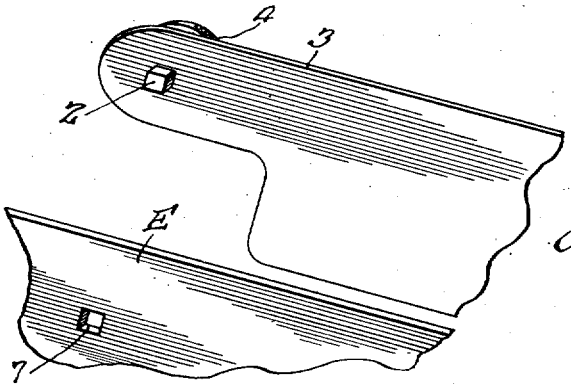
Fig. 4 is an isometric view showing the manner in which the plate about which the material is folded is retained in proper relation to the supporting surface of the slice receiving member.
Figure 5:
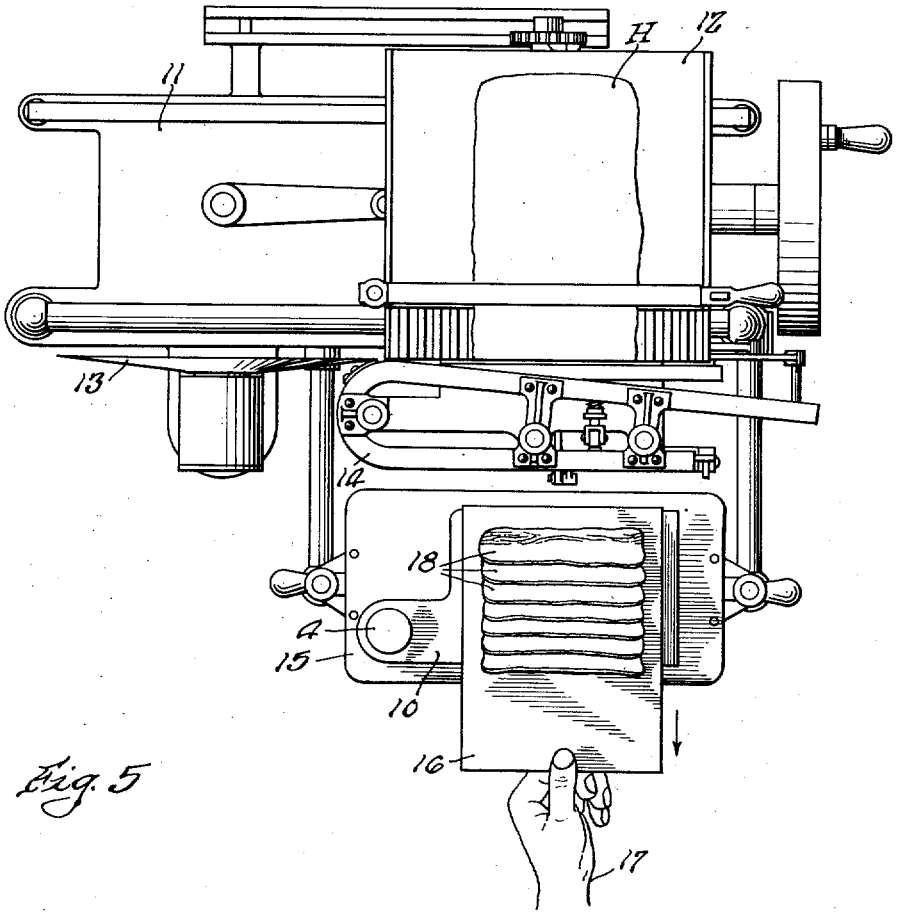
Fig. 5 is a plan view showing the application of this invention to a slicing machine providided with stacking mechanism.

The projection 2 and aperture 1 could be polygonal so as to provide a definite position on the platform E for the plate 3. This arrangement is shown clearly in Fig. 4 in which the projection 2 is shown as square in cross-section and is adapted to fit within the square opening 7 in the platform E. It is obvious that when the projection 2 is arranged within the opening 7, the plate 3 is prevented from turning.

In lieu of the plate 3 being adapted to be lifted entirely away from the platform E, it might be pivotally mounted on the platform so that it could be readily swung into or out of the position in which it receives the food or the position in which it is clear of the platform for permitting the food to be wrapped. In such a case, means may be provided for locking the platform in operative position.

One type of meat stacker with which this invention is adapted to be used is shown in my prior Patent No. 1,290,425, granted January 7, 1919.

I claim:—

1. A method of wrapping and removing foodstuffs from apparatus having a food receiving platform, said method consisting of placing a strip of paper on said platform and placing a relatively thin rigid supporting member on said paper between the ends thereof, folding said strip of paper over the top surface of said member to provide a food receiving surface, depositing the food on said food receiving surface, moving said member clear of said platform, and folding said strip of paper back over the top of the food.

2. The method set forth in claim 1 in which said member is placed on said strip of paper nearer one end than the other.

3. A method of wrapping foodstuffs consisting of folding a strip of wrapping paper, inserting a rigid supporting member between the folds of said strip of wrapping paper, placing the paper and its supporting member on a supporting surface with one of the folded portions of the paper below and one above said supporting member, placing the food on the paper covering the top surface of said supporting member, moving said supporting member away from said supporting surface, and folding the portion of the paper disposed at the lower side of said member back over the top of the food.

4. A method of wrapping foodstuffs consisting of folding a strip of wrapping paper nearer one end than the other, inserting a rigid supporting member between the folds of said strip of wrapping paper, placing the paper and its supporting member on a supporting surface with the longer of said folded portions of said paper disposed below said supporting member and with the shorter of said folded portions disposed over the top surface of said supporting member, placing the food on said shorter portion, removing said supporting member from said supporting surface, folding the portion of the paper disposed at the lower side of said member back over the top of the food and finally wrapping the food in the usual manner.

5. In an apparatus having a food receiving surface the combination of an auxiliary food receiver mounted adjacent said receiving surface, said auxiliary food receiver being adapted to support a folded piece of wrapping paper and being interposed between the folds thereof.

6. In an apparatus having a food receiving surface the combination of an auxiliary food receiver mounted on said receiving surface in a position to receive food thereon and to permit its removal without handling, said auxiliary food receiver comprising a relatively thin rigid member adapted to support a sheet of wrapping paper on one side thereof with the edge of said sheet extending over the edge of said rigid member and across the surface thereof.

7. In an apparatus having a food receiving surface of an auxiliary food receiver movably mounted on said receiving surface and in a position to receive food thereon, said auxiliary food receiver comprising a relatively thin rigid member adapted to support a sheet of wrapping paper thereon with one portion of said sheet of wrapping paper extending over the edge of said rigid member and across the surface thereof to form a food receiving surface for said auxiliary food receiver, said member having a handle thereon to facilitate the removal of said auxiliary food receiver from said food receiving surface.

8. In an apparatus having a food support with a food receiver thereon of an auxiliary food receiver mounted on said receiving surface in a position to receive food thereon and to permit its removal without handling, said auxiliary food receiver comprising a relatively thin rigid member having upper and lower surfaces and an edge portion, said rigid member being adapted to receive a sheet of wrapping material with the sheet of said material extending over and under said rigid member, said member having means thereon to engage said support and position said auxiliary food receiver on said support.

9. In an apparatus for slicing foodstuffs the combination with a support for the substance to be sliced of a slicing knife movably mounted with respect to said support and slice receiving member removably mounted in a position adjacent said slicing knife to receive slices as they are cut by said knife, said member having the upper and lower surfaces thereof unobstructed so as to permit a sheet of wrapping material to extend above and below said member, the portion of said wrapping paper above said member being adapted to receive the slices as they are cut from the substance on said support, said member having a projection theron adapted to engage a recess in a supporting member so as to position said food receiver in a predetermined position relatively to said slicing knife.

10. In an apparatus for wrapping foodstuffs the combination with a support for the substance being sliced of a removable food receiver mounted on a support in predetermined relation to said substance support, a slicing knife adapted to cut slices from the substance on said substance support and deposit the same on said food receiver, said receiver comprising a rigid member having upper and lower surfaces which are unobstructed so as to permit a sheet of wrapping material to be disposed over and under said member, that portion of the wrapping material which is above said member being adapted to receive the slices as they are cut from the substance, said member being pivoted so as to enable one to move said member out of its slice receiving position.

11. The method of wrapping foodstuffs which comprises inserting a substantially rigid member between the folds of a sheet of wrapping material and placing said sheet of wrapping material in a position relatively to the slicing knife of a slicing machine such that said wrapping material will receive the slices as they are cut from the substance by said slicing knife.

12. In a slicing machine, a slice receiving platform adapted to receive a folded piece of wrapping material, and a member adapted to be received between folds of the wrapping material, said wrapping material being adapted to be pulled manually so as to arrange slices thereon in overlapping or shingling relationship.

13. The method of wrapping food stuff which includes arranging a folded sheet of wrapping paper adjacent the cutting edge of a slicing knife and on a foodstuff receiving platform to receive slices cut by the knife, there being a member above the platform receivable within the fold of the wrapping paper.

14. The method of wrapping foodstuff which includes arranging a folded sheet of wrapping paper on a foodstuff receiving platform adjacent a cutting knife from which the foodstuff is delivered, and about a member upon the platform receivable within the fold thereof and with portions of the folds of the sheet arranged to contact.

15. The method of wrapping foodstuff which includes arranging a folded sheet of wrapping paper adjacent a cutting knife from which the foodstuff is delivered, above a foodstuff receiving platform, and about a member upon the platform receivable within the fold of the sheet, the upper fold of the sheet being arranged to overlie the lower fold thereof so that the weight of foodstuff received on the upper fold is directed toward the lower fold.

CORNELIS F. M. VAN BERKEL.